United States Patent
Stits et al.

(10) Patent No.: US 8,723,525 B2
(45) Date of Patent: May 13, 2014

(54) SENSOR IN BATTERY

(75) Inventors: Raymond S. Stits, Carlsbad, CA (US);
Desiree D. Brake, Poway, CA (US);
Gregory T. Bullard, La Mesa, CA (US);
Jason C. Thomas, Carlsbad, CA (US);
Christopher J. Pruetting, Poway, CA (US); Diane M. Winchell, San Diego, CA (US); Albert S. Ludwin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1059 days.

(21) Appl. No.: 12/555,172

(22) Filed: Sep. 8, 2009

(65) Prior Publication Data

US 2011/0001484 A1 Jan. 6, 2011

Related U.S. Application Data

(60) Provisional application No. 61/223,308, filed on Jul. 6, 2009.

(51) Int. Cl.
*G01N 27/416* (2006.01)
*G01R 31/36* (2006.01)
*H02J 7/00* (2006.01)
*G08B 19/00* (2006.01)
*G08B 1/08* (2006.01)
*G08B 17/00* (2006.01)
*G08B 13/14* (2006.01)
*G08B 29/00* (2006.01)
*H04M 1/00* (2006.01)

(52) U.S. Cl.
USPC ............ 324/426; 702/63; 320/134; 320/136; 320/114; 320/107; 340/521; 340/539.26; 340/584; 340/572.8; 340/511; 455/573

(58) Field of Classification Search
CPC ... H01M 2/00; H01M 14/00; H01M 2220/00; H01M 2220/30; H01M 2002/00; H01M 2200/00; H01M 2250/00; H01M 2300/00; H04L 1/00; H04L 67/12; H04W 52/00; H04W 24/00; H04W 92/00; G08C 13/00; G08C 19/00; G01N 1/00; G01N 2001/00; G01N 2201/00; G01N 2203/00; G01N 2027/00; G08B 23/00; G08B 27/00; G08B 25/009; G08B 2001/00; Y02E 10/00; H04B 1/00
USPC ............ 340/855.8, 693.2, 539.1, 539.13, 7.1, 340/7.58, 521, 511, 501, 628, 514; 320/109, 112, 124, 150, 157, 154; 380/59, 247; 455/410, 411; 702/63; 324/426
See application file for complete search history.

(56) References Cited

U.S. PATENT DOCUMENTS 5,795,664 A 8/1998 Kelly
(Continued)

FOREIGN PATENT DOCUMENTS

CN 101208727 A 6/2008
(Continued)

OTHER PUBLICATIONS

International Search Report and Written Opinion—PCT/US2010/041102, International Search Authority—European Patent Office—Nov. 29, 2010.
(Continued)

*Primary Examiner* — Jennifer Mehmood
*Assistant Examiner* — Mirza Alam
(74) *Attorney, Agent, or Firm* — Nicholas J. Pauley; Peter Michael Kamarchik; Joseph Agusta

(57) ABSTRACT

Systems and method for providing sensors in batteries are provided. In certain aspects of the disclosure, a battery comprises a housing dimensioned to fit within a battery compartment of the communication device, a battery cell configured to supply power to the communication device, one or more sensors within the housing configured to measure a condition external to the battery and to received power from the battery cell, and an interface configured to interface the one or more sensors with a processing system in the communication device.

30 Claims, 12 Drawing Sheets

(56) References Cited

U.S. PATENT DOCUMENTS

| | | | |
|---|---|---|---|
| 6,031,454 A | 2/2000 | Lovejoy et al. | |
| 6,517,967 B1* | 2/2003 | Shrim et al. | 429/148 |
| 6,664,000 B1 | 12/2003 | Sonobe | |
| 7,109,859 B2 | 9/2006 | Peeters | |
| 7,148,803 B2 | 12/2006 | Bandy et al. | |
| 7,492,254 B2 | 2/2009 | Bandy et al. | |
| 7,518,504 B2 | 4/2009 | Peeters | |
| 8,310,201 B1* | 11/2012 | Wright | 320/108 |
| 2005/0221366 A1 | 10/2005 | Kraft | |
| 2005/0237030 A1* | 10/2005 | Takenaka | 320/150 |
| 2006/0178170 A1* | 8/2006 | Chung et al. | 455/572 |
| 2006/0181414 A1 | 8/2006 | Bandy et al. | |
| 2006/0202821 A1 | 9/2006 | Cohen | |
| 2006/0261941 A1* | 11/2006 | Drake et al. | 340/539.26 |
| 2006/0267756 A1* | 11/2006 | Kates | 340/521 |
| 2006/0290496 A1 | 12/2006 | Peeters | |
| 2007/0123316 A1* | 5/2007 | Little | 455/573 |
| 2008/0206627 A1* | 8/2008 | Wright | 429/93 |
| 2008/0312853 A1* | 12/2008 | Rocci et al. | 702/63 |
| 2009/0322520 A1 | 12/2009 | Webb | |
| 2011/0152637 A1* | 6/2011 | Kateraas et al. | 600/301 |

FOREIGN PATENT DOCUMENTS

| | | |
|---|---|---|
| CN | 101300485 A | 11/2008 |
| CN | 101300845 A | 11/2008 |
| JP | H11248839 A | 9/1999 |
| JP | 2001102092 A | 4/2001 |
| JP | 2004199910 A | 7/2004 |
| JP | 2005024426 A | 1/2005 |
| JP | 2006164820 A | 6/2006 |
| JP | 2007095365 A | 4/2007 |
| JP | 2008258110 A | 10/2008 |
| JP | 2008544259 A | 12/2008 |
| KR | 20070028293 A | 3/2007 |
| KR | 20080046223 A | 5/2008 |
| TW | 399194 B | 7/2000 |
| TW | 465133 B | 11/2001 |
| TW | 471194 B | 1/2002 |
| TW | 510110 B | 11/2002 |
| TW | 200638731 | 11/2006 |
| WO | WO0244865 | 6/2002 |
| WO | 2007005701 A2 | 1/2007 |

OTHER PUBLICATIONS

Taiwan Search Report—TW099122203—TIPO—Jan. 15, 2013.

* cited by examiner

SENSOR IN BATTERY

CLAIM OF PRIORITY UNDER 35 U.S.C. §119

The present application for patent claims priority to Provisional Application No. 61/223,308 entitled "SENSOR IN BATTERY" filed Jul. 6, 2009, and assigned to the assignee hereof and hereby expressly incorporated by reference herein.

BACKGROUND

I. Field

The following description relates generally to sensors, and more particularly to sensors in batteries.

II. Background

Currently in the Unites States and other countries, there is no widely deployed and continuous operational system capable of detecting, assessing and reacting to a terrorist attack with chemical, biological and/or nuclear weapons or accidental release of dangerous toxins throughout a large area.

Accordingly, there is a need to provide chemical, biological and/or radiation sensors for use by communication devices.

SUMMARY

In an aspect of the disclosure a battery is provided. The battery comprises a housing dimensioned to fit within a battery compartment of the communication device, a battery cell configured to supply power to the communication device, one or more sensors within the housing configured to measure a condition external to the communication device and to received power from the battery cell, and an interface configured to interface the one or more sensors with a processing system in the communication device.

In another aspect of the disclosure, a method for measuring a condition external to a communication device using a battery is provided. The method comprises providing power to the communication device using a battery cell in the battery, measuring the condition external to the communication device using one or more sensors in the battery to obtain a measurement of the condition external to the communication device, and communicating the measurement from the battery to a processing system in the communication device.

In another aspect of the disclosure, an apparatus for measuring a condition external to a communication device, the apparatus configured to fit within a battery compartment of the communication device, is provided. The apparatus comprises means for providing power to the communication device, means for measuring the condition external to the communication device to obtain a measurement of the condition external to the communication device, and means for communicating the measurement to a processing system in the communication device.

In another aspect of the disclosure, a communication device is provided. The communication device comprises a housing comprising a battery compartment dimensioned to receive a battery therein, a processing system, and an interface configured to interface the processing system with one or more sensors in the battery, wherein the processing system is configured to process data from the one or more sensors in the battery to determine whether a contaminate is present outside the communication device.

In another aspect of the disclosure, a method for detecting a contaminate at a communication device is provided. The method comprises receiving power from a battery, receiving data from one or more sensors in the battery, and processing the received data to determine whether the contaminate is present outside the communication device.

In another aspect of the disclosure, an apparatus for detecting a contaminate at a communication device is provided. The apparatus comprises means for receiving power from a battery, means for receiving data from one or more sensors in the battery, and means for processing the received data to determine whether the contaminate is present outside the communication device.

Although particular aspects are described herein, many variations and permutations of these aspects fall within the scope of the disclosure. Whereas some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following Detailed Description. The detailed description and drawings are merely illustrative of the disclosure rather than limiting, the scope of the disclosure being defined by the appended claims and equivalents thereof.

BRIEF DESCRIPTION OF THE DRAWINGS

These and other sample aspects of the disclosure will be described in the detailed description that follows, and in the accompanying drawings, wherein.

In accordance with common practice, some of the drawings may be simplified for clarity. Thus, the drawings may not depict all of the components of a given apparatus (e.g., device) or method. Finally like reference numerals may be used to denote like features throughout the specification and figures.

DETAILED DESCRIPTION

Figure 1:
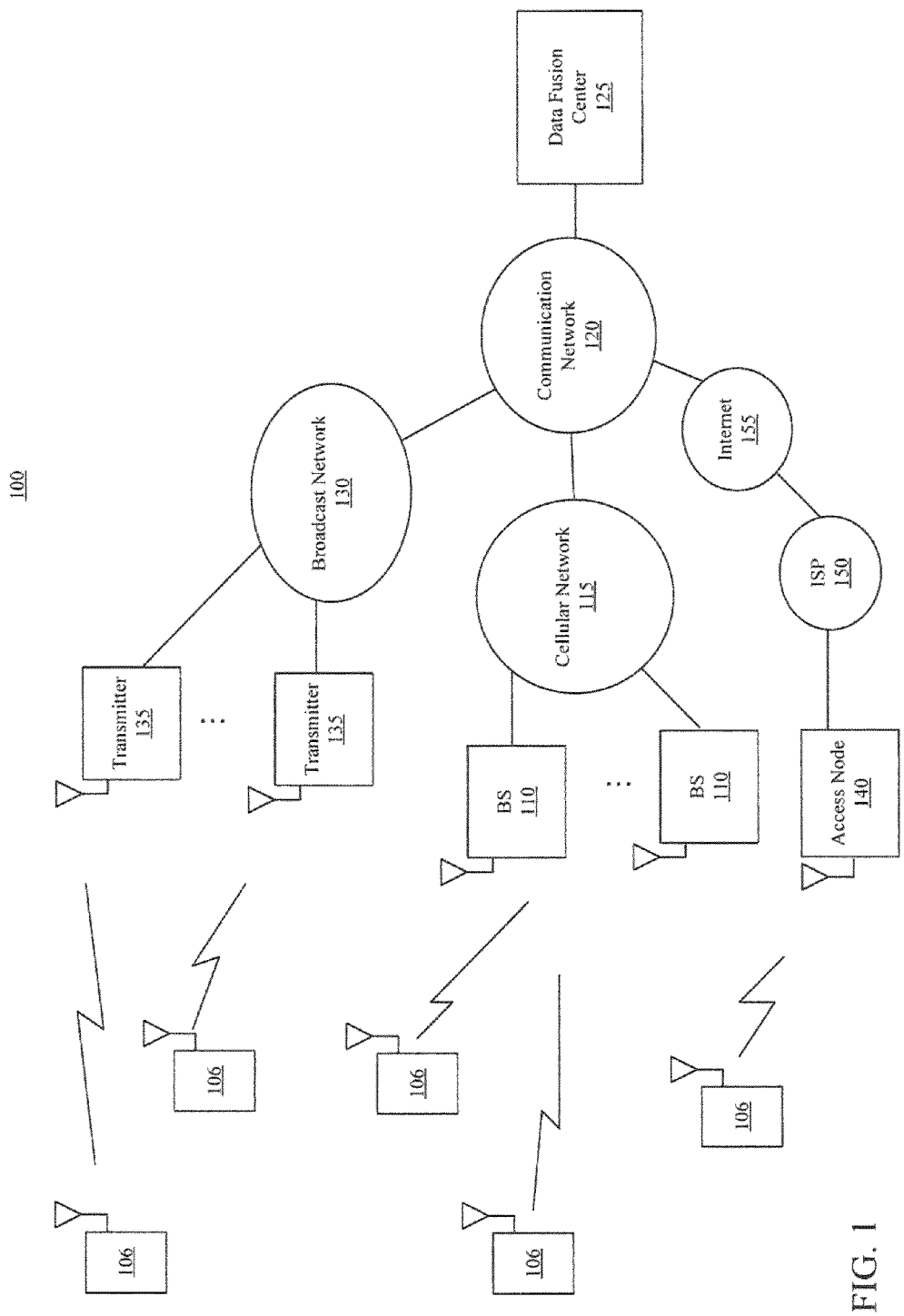
FIG. 1 is a conceptual block diagram illustrating an exemplary communication system.

Various aspects of the disclosure are described more fully hereinafter with reference to the accompanying drawings.

They may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that that the scope of the disclosure is intended to cover any aspect of an apparatus or method contained herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosed herein may be embodied by one or more elements of a claim.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

FIG. 1 is a diagram of an exemplary communication system 100 according to certain aspects of the present disclosure. In one aspect, the communication system 100 may comprise a plurality of communication devices 106. A communication device 106 may also be referred to as a user terminal, an access terminal, a mobile station, a subscriber station, a terminal, a node, user equipment (UE), a wireless device, mobile equipment (ME) or some other terminology. A communication device 106 may be fixed or mobile. Examples of communication devices include a cellular phone, a Personal Digital Assistant (PDA), a laptop, a desktop computer, a digital audio player (e.g., MP3 player), a camera, a game console, a data transceiver or any other suitable communication device. A communication device 106 may comprise one or more antennas for communication over a wireless link.

The communication system 100 may also comprise a plurality of base stations 110 and a cellular network 115. Each base station 110 comprises a transceiver and one or more antennas to provide wireless communication with one or more communication devices 106. In one aspect, each base station 110 communicates with communication devices 106 in a cell or sector serviced by the base station 110. Each cell may correspond to a geographical area covered by the corresponding base station 110. A geographical area covered by a base station 110 may be referred to as a coverage area of the base station 110.

Different technologies may be used to provide communication between the communication devices 106 and the base stations 110 such as (1) a CDMA system that transmits data for different users using different orthogonal code sequences, (2) an FDMA system that transmits data for different users on different frequency subbands, (3) a TDMA system that transmits data for different users in different time slots, (4) a spatial division multiple access (SDMA) system that transmits data for different users on different spatial channels, (5) an orthogonal frequency division multiples access (OFDMA) system that transmits data for different users on different frequency subbands, and so on. A OFDM system may implement IEEE 802.11 or some other air interface standard. A CDMA system may implement IS-2000, IS-95, IS-856, Wideband-CDMA or some other air interface standard. A TDMA system may implement Global System for Mobile Communications (GSM) or some other suitable air interface standard. As those skilled in the art will readily appreciate, the various aspects of the disclosure are not limited to any particular wireless technology and/or air interface standard.

The cellular network 115 may provide communication between the communication devices 106 and other networks (e.g., the Internet, Public Switched Telephone Network (PSTN) or other network) through one or more base station 110. For example, the cellular network 115 may route data received from another network and intended for a communication device 106 to the base station 110 servicing the communication device 106. In another example, the cellular network 115 may route data received by a base station 110 from a communication device 116 to another network. The cellular network 115 may also route data between communication devices 106 through one or more base stations 110. The cellular network 115 may also perform various functions such as coordinating handoff of a communication device 106 between two or more base stations 110 (e.g., when a user of the communication device moves from one cell to another cell), managing transmit power of the communication devices 106 and base stations 110, converting data between different protocols and/or other functions.

The system 100 may further comprise a communication network 120 and a data fusion center 125. In one aspect, the communication network 100 provides communication between the cellular network 115 and the data fusion center 125. In another aspect, the data fusion center 125 may directly communicate with the cellular network 115. The communication network 120 may comprise any network, for example, a LAN network, a WAN network, the Internet, an intranet, a Public Switched Telephone Network (PSTN), an Integrated Services Digital Network (ISDN), other network or a combination thereof. Data in the communication network 120 may be routed to the data fusion center 125 using an address for the data fusion center 125, such as, but not limited to, an IP address, a Domain name, a phone number or other address.

The system 100 also includes a broadcast network 130 and a plurality of transmitters 135. In one aspect, the broadcast network 130 is able to broadcast data to multiple communication devices 106 over a wide geographical area via one or more transmitters 135. The broadcast data may include audio and video streams, messages, or other data. In one aspect, the transmitters 135 may be distributed geographically so that each transmitter 135 covers communication devices 106 within a particularly geographical area. This allows the broadcast network 130 to target broadcast data to communication devices 110 within a particular geographical area by broadcasting the data from the corresponding transmitter 110. The broadcast network 130 may be implemented using any one of a number of technologies supporting data broadcast including MediaFLO, Iseg, Digital Video Broadcasting-Handheld (DVB-H) or other technology. In one aspect, the broadcast network 130 is in communication with the data fusion center 125 via the communication network 120 or directly.

The cellular network 115 may also be used to broadcast data to multiple communication devices 106. For example, the cellular network 115 may broadcast data from a base station 110 using a common channel that is shared by multiple communication devices 106.

The system 100 may further comprise a wireless access node 140, an Internet Service Provider (ISP) 150 and the Internet 155. In one aspect, the wireless access node 140 communicates with communication devices 106 to provide the communication devices 106 with wireless Internet access. The wireless access node 140 may communicate with a communication device 106 using any one of a number of wireless technologies including Wi-Fi, IEEE 802.11, broadband wireless technology, Bluetooth, Zigbee, Near Field Communication (NFC) or other technology. In one aspect, the wireless access node 140 sends data to and receives data from the Internet 155 through the Internet Service Provider (ISP) 150. The wireless access node 140 may be coupled to the ISP 150 via a DSL line, a cable, optical fiber, or other link. Although shown separately in FIG. 1, the Internet 155 may be included as part of the communication network 120. The data fusion center 125 may be in communication with the Internet 155 via the communication network 120 or directly.

Figure 2:
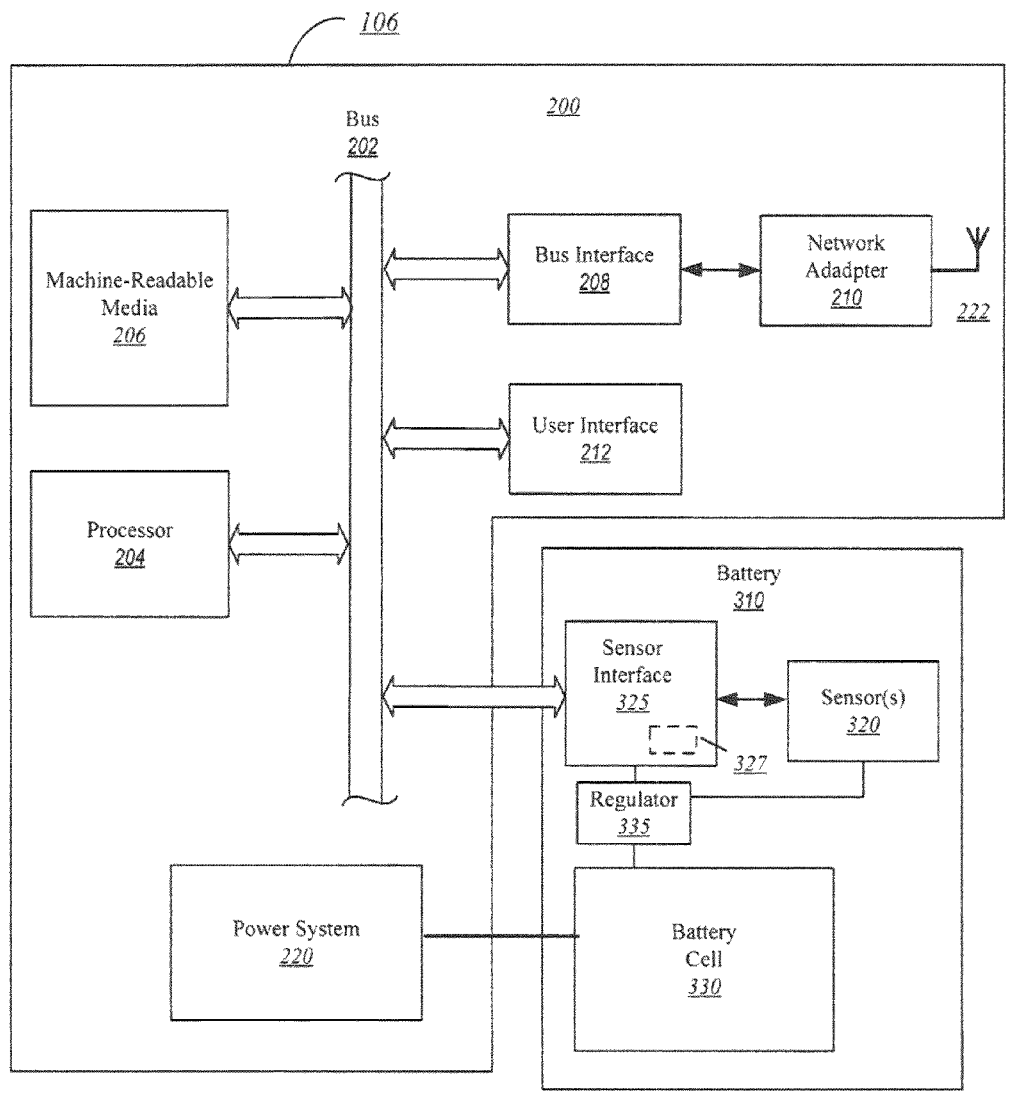
FIG. 2 is a block diagram illustrating a communication device and a battery according to an aspect of the disclosure.

FIG. 2 is a conceptual diagram illustrating an example of a hardware configuration for a communication device 106 and a battery 310 according to certain aspects of the present disclosure. The communication device 106 includes a processing system 200 to perform functions described in this disclosure.

In this example, the processing system 200 may include a bus architecture represented generally by bus 202. The bus 202 may include any number of interconnecting buses and bridges depending on the specific application of the processing system 200 and the overall design constraints. The bus 202 links together various circuits including a processor 204, machine-readable media 206, and a bus interface 208. The bus interface 208 may be used to connect a network adapter 210, among other things, to the processing system 200 via the bus 202. For example, the network adapter 210 may support wireless communication between the communication device 106 and a base station using a transmitter and a receiver implementing any one or a combination of the wireless technologies discussed above including CDMA, TDMA, OFDM and/or other wireless technologies.

A user interface 212 (e.g., keypad, display, mouse, joystick, etc.) may also be connected to the bus 202. The bus 202 may also link various other circuits such as timing sources, peripherals, voltage regulators, power management circuits, and the like, which are well known in the art, and therefore, will not be described any further.

The processor 204 is responsible for managing the bus and general processing, including the execution of software stored on the machine-readable media 206. The processor 204 may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In the hardware implementation illustrated in FIG. 2, the machine-readable media 206 is shown as part of the processing system 200 separate from the processor 204. However, as those skilled in the art will readily appreciate, the machine-readable media 206, or any portion thereof, may be external to the processing system 200. By way of example, the machine-readable media 206 may include a transmission line, a carrier wave modulated by data, and/or a computer product separate from the communication device 106, all which may be accessed by the processor 204 through the bus interface 208. Alternatively, or in addition to, the machine readable media 206, or any portion thereof, may be integrated into the processor 204, such as the case may be with cache and/or general register files.

The processing system 200 may be configured as a general-purpose processing system with one or more microprocessors providing the processor functionality and external memory providing at least a portion of the machine-readable media 206, all linked together with other supporting circuitry through an external bus architecture. Alternatively, the processing system 200 may be implemented with an ASIC (Application Specific Integrated Circuit) with the processor 204, the bus interface 208, supporting circuitry (not shown), and at least a portion of the machine-readable media 206 integrated into a single chip, or with one or more FPGAs (Field Programmable Gate Array), PLDs (Programmable Logic Device), controllers, state machines, gated logic, discrete hardware components, or any other suitable circuitry, or any combination of circuits that can perform the various functionality described throughout this disclosure. Those skilled in the art will recognize how best to implement the described functionality for the processing system 200 depending on the particular application and the overall design constraints imposed on the overall system.

The machine-readable media 206 may comprise a number of software modules stored thereon. The software modules include instructions that when executed by the processor 204 cause the processing system 200 to perform various functions. Each software module may reside in a single storage device or distributed across multiple storage devices. By way of example, a software module may be loaded into RAM from a hard drive when a triggering event occurs. During execution of the software module, the processor 204 may load some of the instructions into cache to increase access speed. One or more cache lines may then be loaded into a general register file for execution by the processor 204. When referring to the functionality of a software module below, it will be understood that such functionality is implemented by the processor 204 when executing instructions from that software module.

The processing system 200 further includes a power system 220. In one aspect, the power system 220 may receive power from the battery 310 and distribute the power to the various components of the processing system 200 including the processor 204, the machine-readable media 206, the bus interface 208, the network adapter 210, and the user interface 212. The power system 220 may also include a regulator for regulating the power to various components and a power management circuit for managing power to various components.

The battery 310 includes one or more battery cells 330, a regulator 335, one or more sensors 320, and a sensor interface 325. The components of the battery 310 may be housed within a battery housing 410 (shown in FIGS. 4A and 4B) that is configured to be inserted into and removed from a battery compartment 430 of the communication device 106. The battery compartment 430 may be located at the back of the communication device 106 or other location of the communication device 106.

The battery cells 330 are configured to store energy (e.g., electrochemical energy) to provide power for the communication device 106. The battery cells 330 may comprise an array of interconnected cells (e.g., lithium-ion (Li-Ion) cells, nickel-cadmium (NiCd) cells, nickel metal hydride (NiMH) cells, etc.). The regulator 335 may be configured to regulate power from the battery cells 330 to power the sensor interface 325 and the sensors 320. For example, the regulator 335 may include a voltage regulator that provides a relatively stable DC voltage under various load conditions.

The one or more sensors 320 may comprise chemical, biological, radiation, humidity and/or temperature sensors. The sensors 320 may be implemented using various sensor technologies. For example, chemical sensors may comprise a material that absorbs a particular chemical, which produces a change in a property of the material. By way of example, the material may be incorporated into a sensor in which absorption of a desired chemical by the material causes a detectable change in an electrical property (e.g., capacitance, resistance, resonant frequency, etc.) of the sensor. The sensors 320 may include a plurality of sensors comprising different materials (e.g., polymers, ceramics, metals or combination thereof) that are sensitive to different chemicals, biological substances and/or types of radiation for detecting a plurality of different chemicals, biological substances and/or types of radiation. Chemicals, biological substances and radiation may also be detected using a combination of two or more sensors.

A chemical sensor may be configured to detect harmful chemicals such as nerve agents (e.g., Sarin gas), tear gas, toxins, industrial chemicals and other hazardous chemicals. A biological sensor may be configured to detect harmful biological substances such as Anthrax, diseases and other hazardous biological substances. A radiation sensor may be configured to detect harmful radiation such as x-rays, gamma rays, alpha rays, beta rays and other harmful rays (e.g., emitted by radioactive material). In this disclosure, harmful chemicals, biological substances and radiation may be referred to as contaminates.

The sensors 320 may comprise discrete sensors and/or multiple sensors integrated on a substrate. The battery 310 may have one or more vent holes 460 (shown in FIG. 4A) located near the sensors 320. The vent holes 460 may be used to allow chemicals, biological substances and/or other airborne contaminates from the external environment to enter the battery housing 410 and interact with one or more internal sensors 320. In another aspect, one or more of the sensors 320 may be disposed on an external surface of the battery 310.

The sensor interface 325 interfaces the sensors 320 with the processor 204. For example, the sensor interface 325 may convert analog sensor signals from the sensors 320 into digital sensor data for analysis by the processor 204. The sensor interface 325 may also perform other signal processing on the sensor signals including filtering, and/or amplification. The sensor interface 325 may also receive instructions from the processor 204 for taking readings from one or more of the sensors 320. When the sensor interface 325 receives an instruction from the processor 204 to take a reading from one of the sensors 320, the sensor interface 325 may activate the sensor 320, process the resulting sensor signal into sensor data for analysis by the processor 204 and send the sensor data to the processor 204.

The processor 204 may also identify a sensor type in the instructions to take a sensor reading. For example, the identified sensor type may be directed to a particular one of the sensors 320 that is configured to detect a particular type of chemical, biological substance and/or radiation. In this example, upon receiving the instruction, the sensor interface 325 may activate the identified sensor 320, process the resulting sensor signal into sensor data and send the sensor data to the processor 204. The sensor interface 325 may also include an identifier identifying the sensor type. The processor 204 may use the identifier to execute the software for analyzing sensor data for the identified sensor type, as discussed further below.

The sensor interface 325 may be implemented with an ASIC, one or more FPGAs, PLDs, controllers, state machines, gated logic, discrete hardware components, or any other suitable circuitry, or any combination of circuits. The sensor interface 325 may also include machine-readable media 327 for storing instructions from the processor 204, temporarily storing sensor data, and/or storing software executed by a processor of the sensor interface 325 for implementing functions described herein. The machine-readable media may include RAM, flash memory, ROM, PROM, EEPROM, registers, or any other suitable storage media.

The processor 204 and the sensor interface 325 may communicate via the bus 202 and/or other structures or devices. For example, as discussed further below, the processor 204 and the sensor interface 325 may communicate over a short-range wireless link using a pair of wireless transceivers implemented with any one or a number of wireless technologies including Bluetooth, Zigbee or other wireless technology.

In certain aspects, the processor 204 may be configured to analyze sensor data from the sensor interface 325 to measure environmental conditions external to the communication device 106 (e.g., determine whether a chemical, biological substance, radiation or other contaminate is present). For example, the processor 204 may determine whether a contaminate is present by comparing a level in sensor data received from the sensor interface 325 to a sensor threshold. In this example, the processor 204 may determine that a particular contaminate is present if the level of the sensor data is above the sensor threshold. The processor 204 may determine whether a particular contaminate is present based on sensor data from a plurality of different sensors 320. In one aspect, the processor 204 may execute software which detects a particular contaminate from sensor data by recognizing a pattern in the sensor data that corresponds to the contaminate. The software may employ any number of analytical tools to detect a particular contaminate from sensor data including, but not limited to, a neutral network, principle component analysis, classifiers, and other analytical tools.

After the processor 204 detects a contaminate based on received sensor data, the processor 204 may report the detected contaminate to the data fusion center 125 using the network adapter 210. The report may also include the type of contaminate detected and the geographical location of the detection, which may be provided by a positioning device (e.g., GPS device) in the communication device 106. The data fusion center 125 may also receive reports of detected contaminates from other communication devices 106. These communication devices 106 may be dispersed throughout a large area, creating a vast network of sensors capable of detecting chemicals, biological substances, radiation and/or other contaminates throughout the large area. This allows the data fusion center 125 to detect contaminates throughout the large area using the sensor network.

Figure 3:
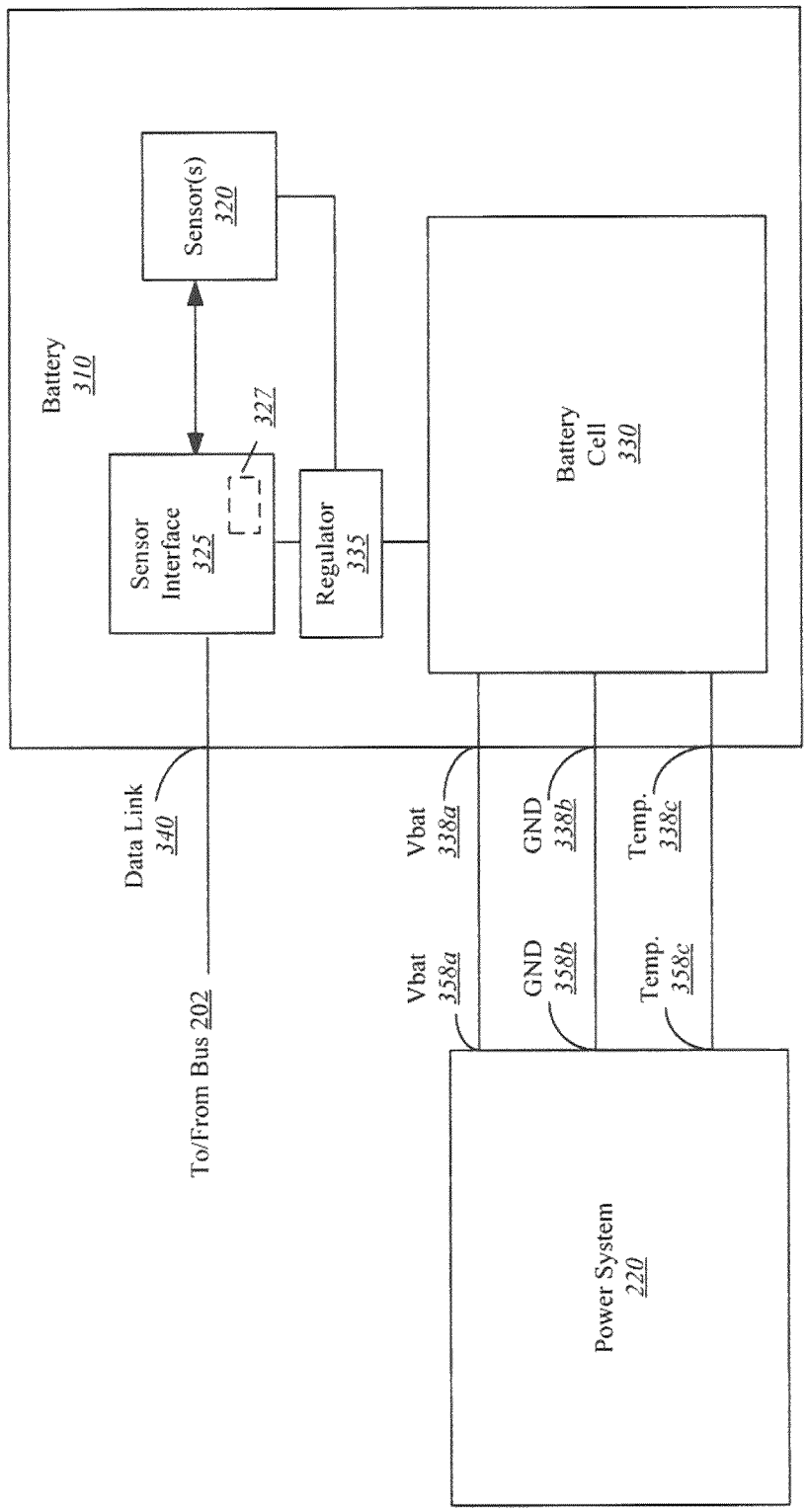
FIG. 3 is a block diagram illustrating a battery including one or more sensors according to an aspect of the disclosure.

FIG. 3 is a conceptual diagram illustrating the battery 310 according to certain aspects of the present disclosure. The one aspect, the battery cells 330 includes three terminals 338a-338c that interface with terminals 358a-358c of the power system 220, respectively. The terminals 338a-338c of the battery cells 330 may include a voltage terminal 338a, a ground terminal 338b, and a temperature sensor 338c. Similarly, the terminals 358a-358c of the power system 220 may include a voltage terminal 358a, a ground terminal 358b, and a temperature sensor 358c.

The voltage terminal 338a may be used to provide a voltage from the battery cells 330 to the voltage terminal 358a of the power system 220 to power the communication device 106. The battery 310 and power system 220 may include additional voltage terminals. The ground terminal 338b may be used to electrically couple a ground of the battery cells 330 to the ground terminal 358b of the power system 220. The temperature terminal 338c may be used to communicate a temperature reading from a temperature sensor within or adjacent to the battery cells 330 to the temperature terminal 358c of the power system 220. The power system 220 may use the received temperature reading to detect overheating of the battery cells 330 and to shutoff power from the battery cells 330 when overheating is detected.

The battery 310 also includes a data link terminal 340 for coupling the sensor interface 325 to the bus 202. The data link terminal 340 enables the sensor interface 325 to communicate sensor data to the processor 204 via the bus 202. The data link terminal 340 may also enable the sensor interface 325 to receive instructions from the processor 204 via the bus 202. For example, the sensor interface 325 may receive instructions from the processor 204 to take a sensor reading and send the resulting sensor data to the processor 204.

The data link terminal 340 may be implemented using a data interface including, but not limited to, Inter-Integrated Circuit (I2C), Serial Peripheral Interface (SPI), 1 wire, Universal Asynchronous Receiver/Transmitter (UART), or other suitable data interface standard. The data link terminal 340 may transmit and receive data serially using a serial data interface or in parallel using a parallel data interface.

Figure 4A:
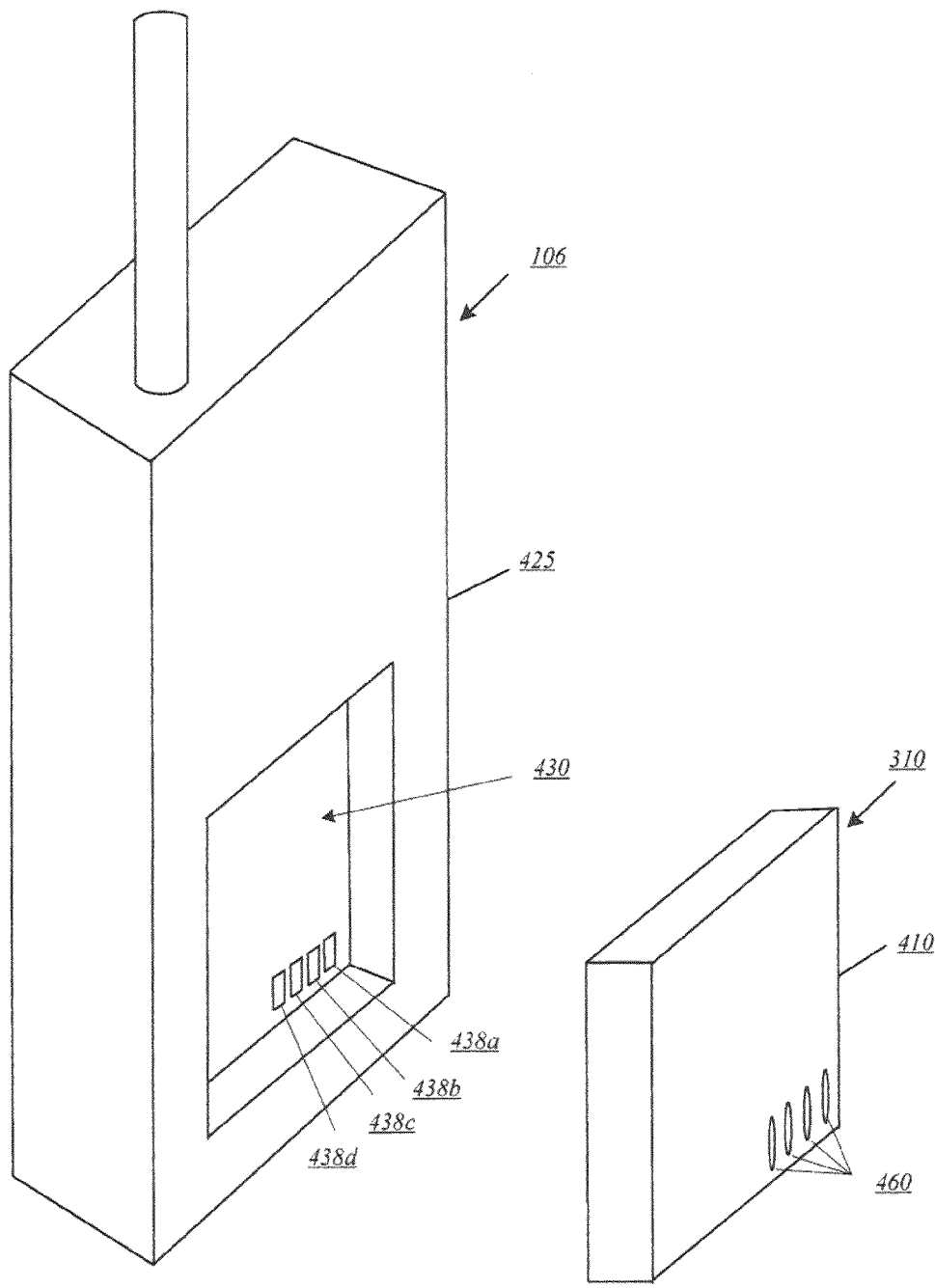
FIG. 4A is a perspective view of a communication and a battery according to an aspect of the disclosure.

FIG. 4A shows a perspective view of the communication device 106 and the battery 310 according to certain aspects of the disclosure. The communication device 106 includes a device housing 425 that houses all or a portion of the processing system 200 of the communication device 106. The battery 310 includes a battery housing 410 that houses the sensors 320, the sensor interface 325, the battery cells 330 and the regulator 335.

The device housing 425 includes a battery compartment 430 configured to receive the battery 310 therein. The battery 310 may be inserted into and removed from the battery compartment 430. The battery compartment 430 may also include a slot (not shown) for receiving a Subscriber Identity Module (SIM) card. In FIG. 4A, the battery 310 is shown outside the battery compartment 430 for ease of illustration.

The communication device 106 may also include electrical contacts 438a-438d disposed within the battery compartment 430. The contacts 438a-438c may be coupled to the voltage terminal 358a, the ground terminal 358b and the temperature terminal 358c of the power system 220, respectively. The contact 438d may be coupled to the bus 202.

Figure 4B:
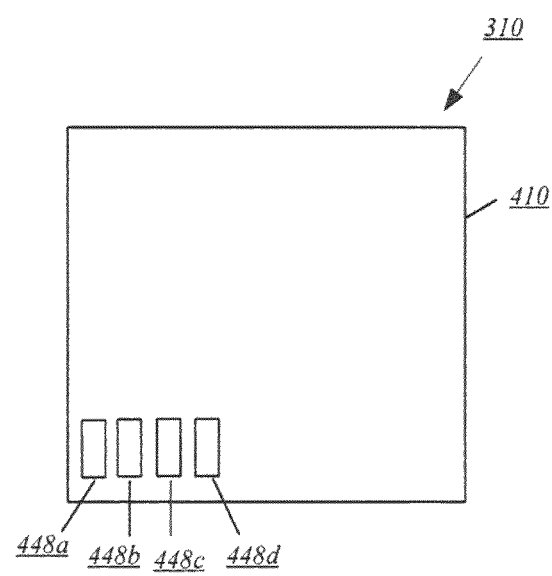
FIG. 4B is a front view of the battery in FIG. 4A.

The battery 310 may include corresponding electrical contacts 448a-448d disposed on a front surface of the battery housing 410 (shown in FIG. 4B). The contacts 448a-448c may be coupled to the voltage terminal 338a, the ground terminal 338b and the temperature terminal 338c of the battery cells 330, respectively. The contact 448d may be coupled to the data link terminal 340. Although one contact 448d is shown in the example in FIG. 4B, the battery 310 may include two or more contacts 448d coupled to the data link terminal 340 depending, for example, on the data interface standard used for the data link terminal 340. For example, a UART implementation of the data link terminal 340 may have two lines (Rx/Tx) using two contacts 448d. In this example, the communication device 106 may include two corresponding contacts 438d within the battery compartment 430 and coupled to the bus 202.

The contacts 448a-448d may be positioned on the battery housing 420 so that each contact 448a-448d makes contact with a corresponding one of the contacts 438a-438d within the battery compartment 430 when the battery 310 is inserted into the battery compartment 430. The contacts 438a-438d and 448a-448d are not limited to the arrangements shown in the example in FIGS. 4A and 4B and may be positioned in other arrangements within the battery compartment 430 and on the battery housing 410. For example, the contacts 448a-448d may be arranged along a bottom surface of the battery housing 410 with the contacts 438a-438d arranged along a corresponding surface of the battery compartment 430. Further, the contacts 438a-438d and 448a-448d may have various shapes. For example, the contacts 438a-438d and 448a-448d may have planer contact surfaces as shown in FIGS. 4A and 4B. In another example, the contacts 438a-438d and 448a-448d may comprise pin connectors and corresponding slots.

In one aspect, the contacts 438a and 448a may be used to electrically couple the voltage terminal 338a of the battery cell 330 with the voltage terminal 358a of the power system 220. The contacts 438b and 448b may be used to electrically couple the ground terminal 338b of the battery cells 330 with the ground terminal 358b of the power system 220. The contacts 438c and 448c may be used to communicate a temperature reading from the temperature terminal 338c of the battery cells 330 to the temperature terminal 358c of the power system 220. The contacts 438d and 448d may be used to communicate data between the data link terminal 340 of the battery 310 and the bus 202. The contacts 438d and 448d may include any number of contacts depending on the data interface standard used to communicate data between the bus 202 and the battery 310, including, but not limited to I2C, SPI, 1 wire, UART or other suitable data interface standard. The communication device 106 and the battery 310 may include additional contacts. For example, the communication 106 and the battery 310 may include contacts for communicating the battery type and/or identification (ID) from the battery 310 to the processor 204.

In one aspect, the battery housing 410 includes vent holes 460 to allow airborne contaminates from the external environment to enter the battery housing 410 and interact with one or more of the sensors 320 within the battery housing 410. In this aspect, the vent holes 460 may be located on a back surface of the battery housing 410, as shown in the example in FIG. 4A. In this example, the back surface of the battery housing 410, and hence the vent holes 460, are exposed to the external environment when the battery 310 is placed in the battery compartment 430. In another example, the communication 106 may include a battery cover (not shown) that is placed over the battery 310 in the battery compartment 430. In this example, the battery cover may include vent holes that are aligned with the vent holes 460 of the battery housing 410 when the battery 310 is in the battery compartment 430.

Figure 5:
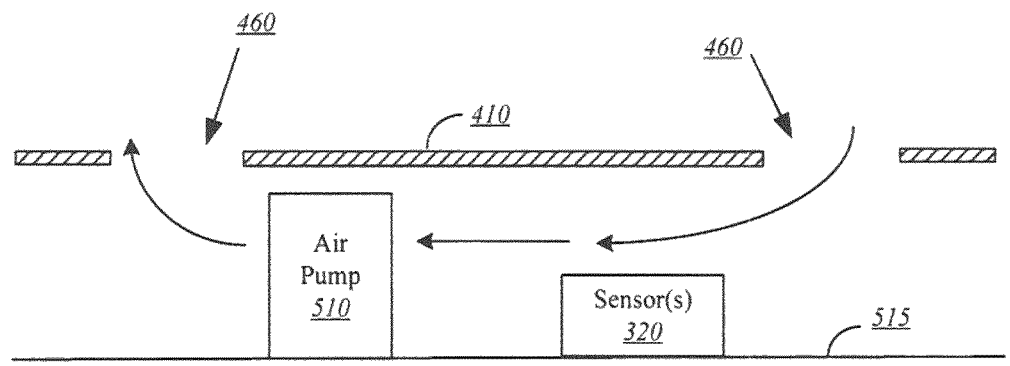
FIG. 5 is a cross-section of a battery according to an aspect of the disclosure.

FIG. 5 is a cross-sectional view of the battery 310 illustrating the battery housing 410, the vent holes 460 of the battery housing 410 and one or more of the sensors 320 within the battery housing 410. In this example, the sensors 320 are positioned near the vent holes 460 so that the sensors 320 are exposed to airborne contaminates that enter the battery housing 410 through the vent holes 460. The airborne contaminates may include airborne chemical and/or biological substances and the sensors 320 may include chemical and/or biological sensors to detect the airborne chemical and/or biological substances. The sensors 320 may be mounted on a support structure 515 within the battery housing 410. The support structure 515 may include a substrate (semiconductor substrate), a printed circuit board, a base or other suitable support structure.

In one aspect, the battery 310 may include an air pump 510 to move air from the external environment through the interior of the battery housing 410. The air pump 510 may be implemented with a miniature electric fan or other device. The movement of air exposes the sensors 320 to a larger amount of air borne contaminates in the air, which enhances chemical and/or biological detection by the sensors 320. An example of air flow through the interior of the battery housing 410 is indicated by arrows in FIG. 5. In this example, the air pump 510 creates a flow of air through the interior of the battery housing 410, in which air enters the battery housing 410 through one of the air vents 460 and exits the battery housing 410 through another one of the air vents 460.

In one aspect, the air pump 510 may be powered by the battery cells 330 through the regulator 335 and the sensor interface 325 may control the power to the air pump 510. In this aspect, the sensor interface 325 may power on the air pump 510 when the sensor interface 325 takes a sensor reading from one or more of the sensors 320.

Figure 6:
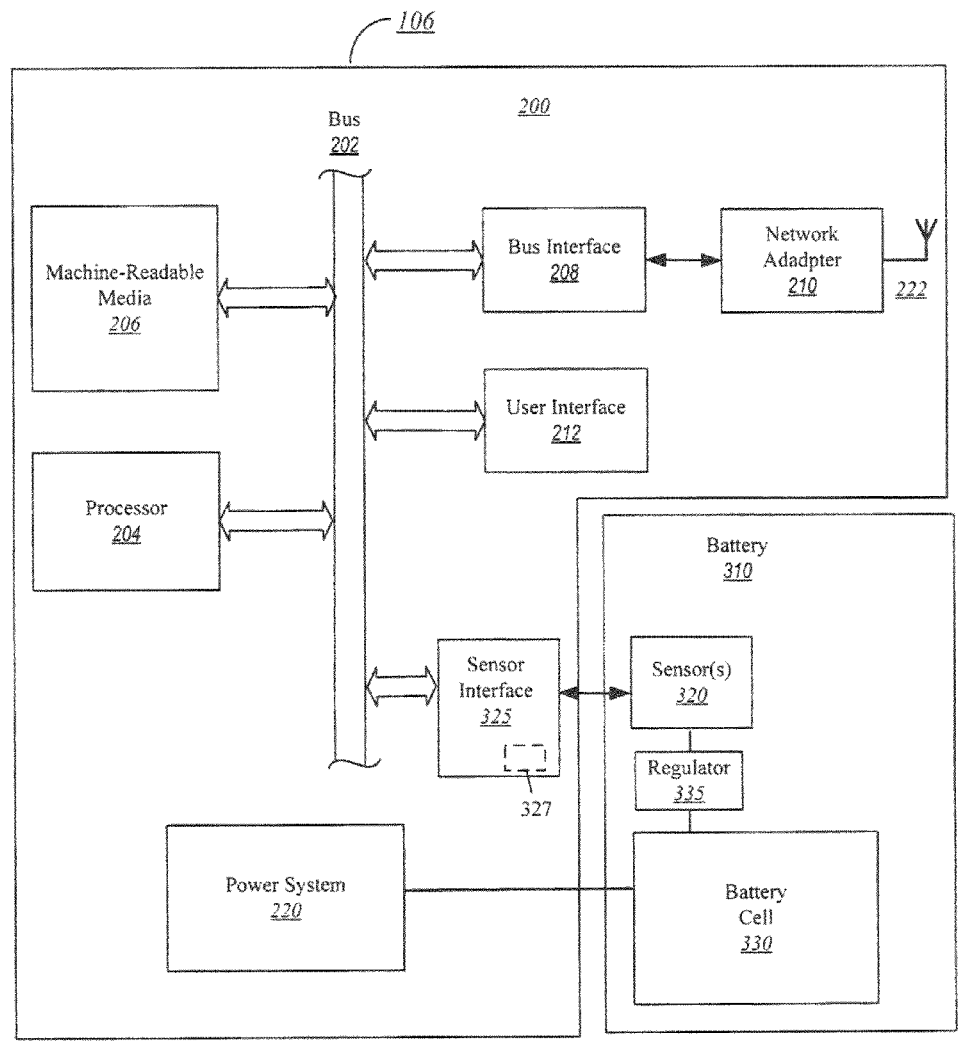
FIG. 6 is a block diagram illustrating a communication device and a battery according to another aspect of the disclosure.

FIG. 6 is a conceptual diagram in which the communication device 106 includes the sensor interface 325 according to certain aspects of the present disclosure. In one aspect, the sensor interface 325 of the communication device 106 may be coupled to the sensors 320 of the battery 310 via the contacts 438d and 448d (shown in FIGS. 4A and 4B). In this aspect, the sensor interface 325 may activate the sensors 320 to take sensor readings and receive sensor signals from the sensors 320 through an analog and/or digital interface. For the example of an analog interface, the sensor interface 325 may include an analog-to-digital (A/D) converter for converting an analog sensor signal from the sensors 320 into digital sensor data. The sensor interface 325 may then send the sensor data to the processor 204 via the bus 202.

Figure 7:
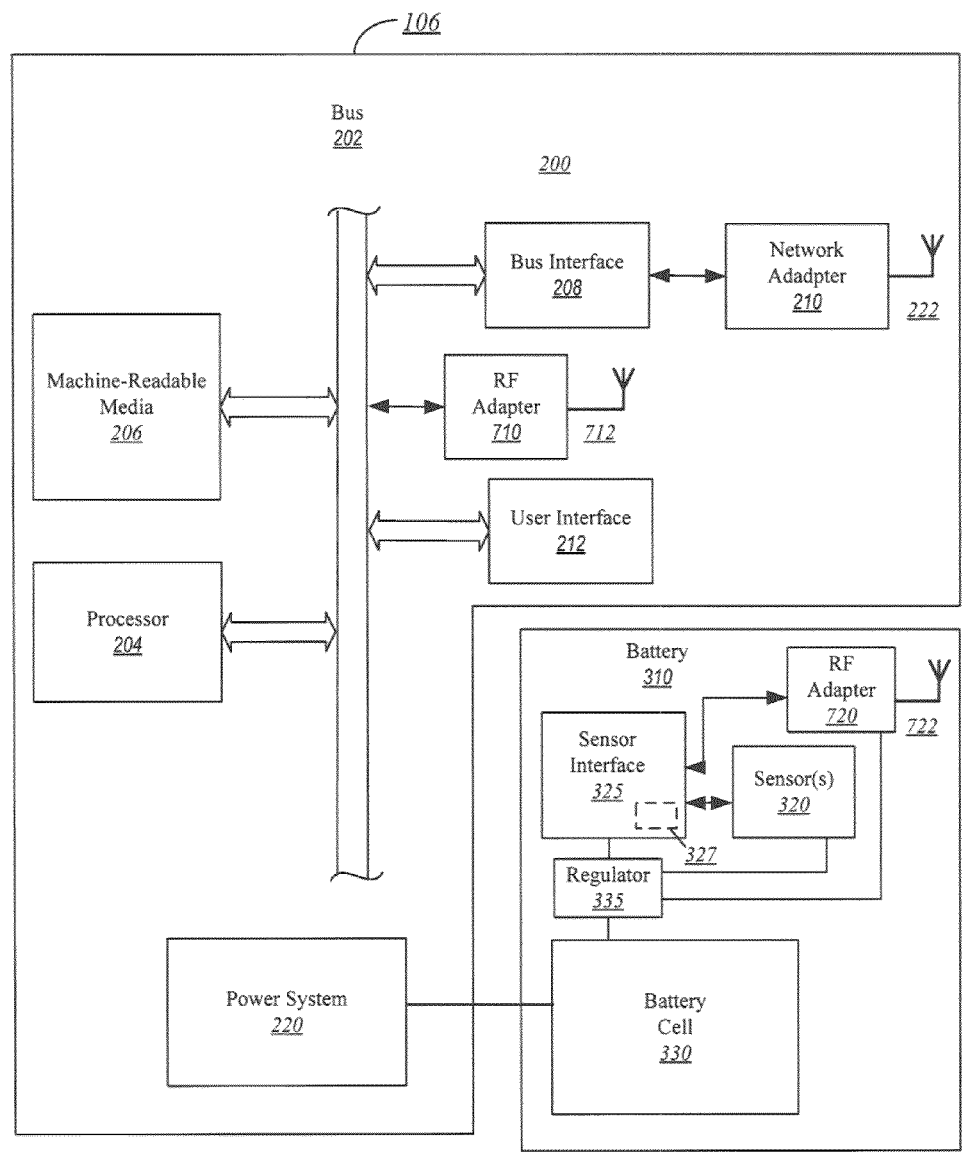
FIG. 7 is a block diagram illustrating a communication device and a battery according to yet another aspect of the disclosure.

FIG. 7 is a conceptual diagram of the communication device 106 and the battery 310 according to certain aspects of the present disclosure. In one aspect, the communication device 106 includes a radio frequency (RF) adapter 710 and an antenna 712 and the battery 310 includes an RF adapter 720 and an antenna 722. Each RF adapter 710 and 720 may include a transmitter and a receiver to provide wireless communication via the respective antennas 712 and 722. The RF adapter 710 for the communication device 106 may use the same antenna 222 as the network adapter 212. Further, the RF adapter 710 may be incorporated into the network adapter 210.

In this aspect, the sensor interface 325 and the processor 204 may communicate with one another over a wireless link using the respective RF adaptors 710 and 720. Each RF adapter 710 and 720 may be implemented with any one of a number of wireless technologies including Wi-Fi, IEEE 802.11, broadband wireless technology, Bluetooth, Zigbee, Near Field Communication (NFC) or other technology. For example, the sensor interface 325 may receive instructions from and send sensor data to the processor 204 over the wireless link. In this aspect, the contacts 438d and 448d (shown in FIGS. 4A and 4B) may be omitted from the battery compartment 430 and the battery 310, receptively. The sensor interface 325 may also use the RF adaptor 720 to communicate with other devices over a wireless link. For example, the sensor interface 325 may use the RF adapter 720 to send sensor data to another communication device 106.

In one aspect, the sensor interface 325 may operate in a low power mode when the communication device 106 is turned off or the battery 310 is removed from the battery compartment 430. For example, the sensor interface 325 may detect when the communication device 106 is turned off or the battery is removed from the battery compartment 430 when the sensor interface 325 sends a message to the processor 204 and does not receive an acknowledgement from the processor 204 in response to the message. In another example, when the communication device 106 is in the process of powering down, the processor 204 may send a message to the sensor interface 325 that the communication device 106 is powering down.

In the low power mode, the sensor interface 325 may periodically wakeup from a sleep state to take sensor readings from the sensors 320. For example, the sensor interface 325 may store a time interval between wakeups in the machine-readable media 327 and use a low-power counter or other timing circuit in the battery 310 to keep track of time for timing wakeups based on the time interval between wakeups. The time interval between wakeups may be selected to keep the rate of power consumption low.

When the sensor interface 325 wakes up and takes sensor readings from the sensors 320, the sensor interface 325 may store the sensor data in the machine-readable media 327. The sensor interface 325 may also include a time stamp with the stored sensor data indicating the approximate time of the sensor data. The time stamp may be provided by a timing circuit used to time wakeups, as discussed above.

When the communication device 106 powers back on or the battery 310 is inserted into the battery compartment 430, the sensor interface 325 may send the sensor data and corresponding time stamps from the machine-readable media 327 to the processor 204. For example, when the communication device 106 is in the process of powering up, the processor 204 may send a message to the sensor interface 325 that the communication device 106 is powering up. Upon receiving this message, the sensor interface 325 may send the stored sensor data to the processor 204.

The processor 204 may also send instructions to the sensor interface 325 to enter the low power mode or turn off. For example, the processor 204 may do this when the battery 310 has low power. Also, the processor 204 may send instructions to the sensor interface 325 specifying the time interval between wakeups.

Further, the processor 204 may send instructions to the sensor interface 325 not to use one of the sensors 320. For example, the processor 204 may determine that one of the sensors 320 is defective based on sensor data from the sensor 320 and/or a message from the data fusion center 125 that a reported detection based on sensor data from the sensor 320 is false. In this example, the processor 204 may send an identifier to the sensor interface 325 identifying the sensor 320. Upon receiving the identifier and instructions not to use the identified sensor 325, the sensor interface 325 may stop taking sensor readings from the identified sensor 320. The sensor interface 325 may store the identity of the sensor 320 in the machine-readable media 327.

Further, the processor 204 may send instructions to the sensor interface 325 to take sensor readings from a particular one of the sensors 320 at a more frequent rate. For example, the processor 204 may send an identifier to the sensor interface 325 identifying the sensor and a time interval between sensor readings. Upon receiving the identifier and the time interval, the sensor interface 325 may take sensor readings from the identified sensor 320 based on the time interval. The sensor interface 325 may store the identity of the sensor 320 and the time interval in the machine-readable media 327. In this example, the processor 204 may receive a message from the data fusion center 125 of a heightened threat alert for a particular type of chemical, biological substance and/or radiation. Upon receiving this message, the processor 204 may send instructions to the sensor interface 325 to take sensor readings from one of the sensors 320 corresponding to the particular type of chemical, biological substance and/or radiation at a higher frequency rate.

The battery 310 also allows the same communication device 106 to be designed and manufactured for multiple markets including markets in which the sensors 320 are not used. For markets where the sensors are not used, the communication device 106 may use a battery without the sensors 320. Thus, the communication device 106 may be used in markets that do not use the sensors 320 without incurring the additional cost of the sensors 320 by inserting a battery without the sensors 320 into the communication device 106.

The battery 310 also allows the same communication device 106 to be designed and manufactured for multiple markets including markets in which the sensors 320 are not used. For markets where the sensors are not used, the communication device 106 may use a battery without the sensors 320. Thus, the communication 106 may be used in markets that do not use the sensors 320 without incurring the additional cost of the sensors 320 by inserting a battery without the sensors 320 into the communication device 106.

Further, the sensors 320 used by the communication device 106 can be replaced by replacing the battery 310 with a new battery 310 with new sensors 320. For example, a user may replace the battery 310 when the power capacity of the battery 310 has degraded. The battery replacement provides the user with an opportunity to also replace the sensors 320.

Figure 8:
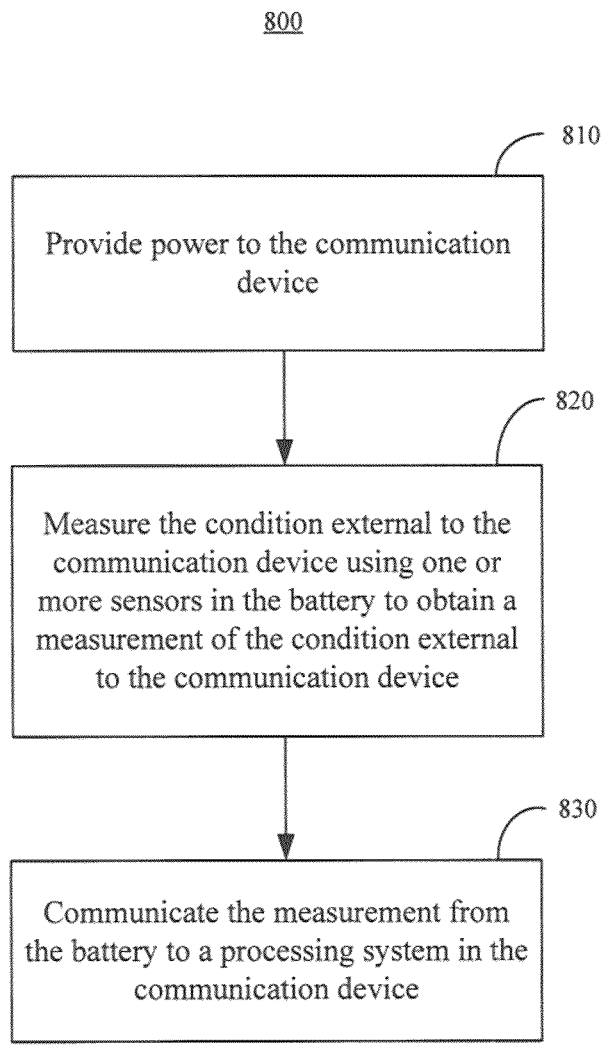
FIG. 8 is a flowchart of a process for measuring a condition external to a communication device using a battery.

FIG. 8 is a flow diagram illustrating a method 800 for measuring a condition external to a communication device 106 using a battery 310. In step 810 power is provided to the communication device 106 using a battery cell 330 in the battery 310. In step 820, the condition external to the communication device 106 is measured using one or more sensors 320 in the battery 310 to obtain a measurement of the condition external to the communication device 106. In step 830, the measurement is communicated from the battery 310 to a processing system 200 in the communication device 106.

Figure 9:
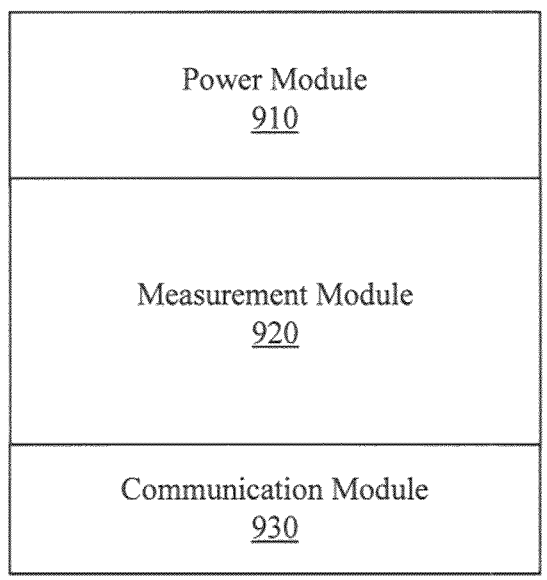
FIG. 9 is a block diagram illustrating an example of the functionality of an apparatus for measuring a condition external to a communication device.

FIG. 9 is a block diagram illustrating an example of the functionality of an apparatus 900 for measuring a condition external to a communication device 106. In one aspect, the apparatus 900 is configured to fit within a battery compartment of the communication device 106. The apparatus 900 includes a power module 910 for providing power to the communication device 106, a measurement module 920 for measuring the condition external to the communication device 106 to obtain a measurement of the condition external to the communication device 106, and a communication module 920 for communicating the measurement to a processing system 200 in the communication device 106.

Figure 10:
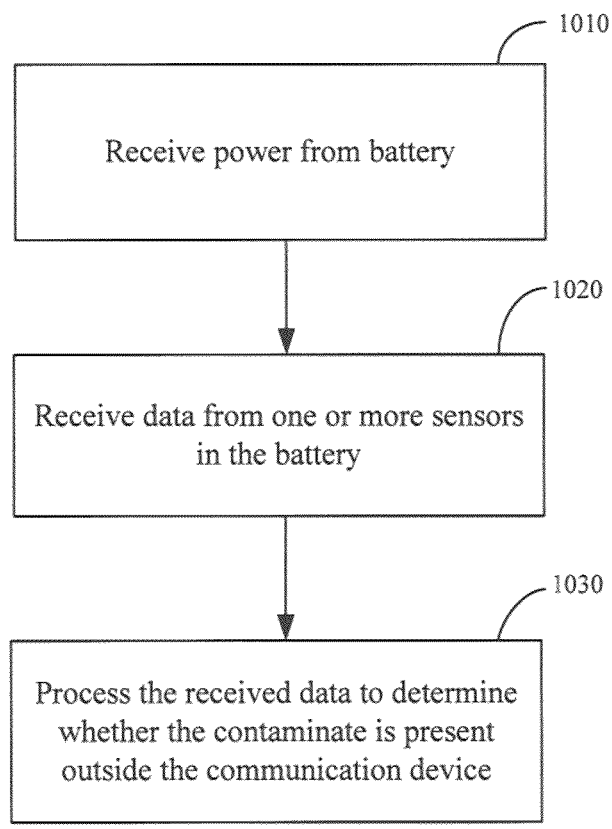
FIG. 10 is a flowchart of a process for detecting a contaminate at a communication device.

FIG. 10 is a flow diagram illustrating a method 1000 for detecting a contaminate at a communication device 106. In step 1010, power is received from a battery 310. In step 1020, data is received from one or more sensors 320 in the battery 310. In step 1030, the received data is processed to determine whether the contaminate is present outside the communication device 106.

Figure 11:
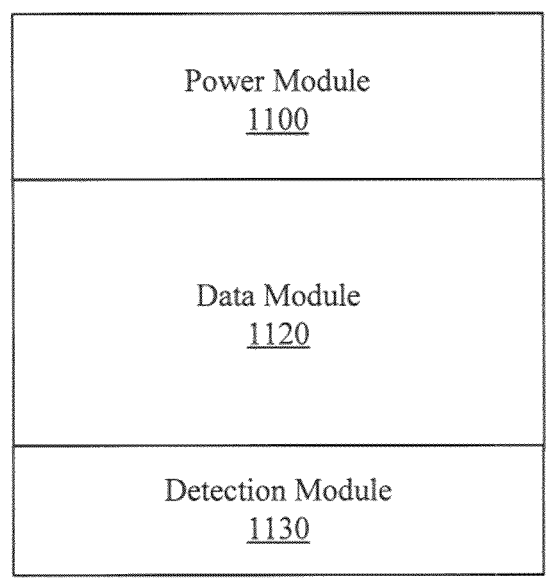
FIG. 11 is a block diagram illustrating an example of the functionality of an apparatus for detecting a contaminate at a communication device.

FIG. 11 is a block diagram illustrating an example of the functionality of an apparatus 1100 for detecting a contaminate at a communication device 106. The apparatus 1100 includes a power module 1110 for receiving power from a battery, a data module 1120 for receiving data from one or more sensors 320 in the battery 310, and a detection module 1130 for processing the received data to determine whether the contaminate is present outside the communication device 106.

Those of skill in the art would appreciate that the various illustrative blocks, units, elements, components, methods, and algorithms described herein may be implemented as electronic hardware, computer software, or combinations of both. To illustrate this interchangeability of hardware and software, various illustrative blocks, units, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A battery for supplying power to a communication device, comprising:
   a battery housing dimensioned and configured to be insertable in and removable from a battery compartment of the communication device;
   electrical contacts disposed on the battery housing;
   a battery cell within the battery housing, connected to the electrical contacts, and configured to supply power when the battery housing is inserted in the battery compartment, through at least two of the electrical contacts, to the communication device;
   one or more contaminate sensors within the battery housing and configured to measure, when the battery housing is inserted in the battery compartment, a contaminate condition external to the communication device and generate corresponding measurements; and
   an interface configured to interface the one or more contaminate sensor, when the battery housing is inserted in the battery compartment, with a processing system in the communication device, wherein interface includes communicating the measurements from the one or more contaminate sensors to the processing system.

2. The battery of claim 1, wherein the one or more contaminate sensors are from a group consisting of chemical sensors, biological sensors and radiation sensors.

3. The battery of claim 1, wherein the interface is configured to communicate with the processing system in the communication device through at least one of the electrical contacts and a corresponding at least one electrical contact in the battery compartment when the battery housing is placed within the battery compartment.

4. The battery of claim 1, wherein the interface comprises a wireless transceiver configured to communicate with the processing system in the communication device over a wireless link.

5. The battery of claim 1, wherein the interface includes a sensor interface configured to receive a sensor signal from the one or more contaminate sensors, to process the received sensor signal into sensor data indicating the measurements and to send the sensor data to the processing system in the communication device.

6. The battery of claim 5, further comprising a memory within the battery housing, wherein the sensor interface is configured to store the sensor data in the memory and to send the sensor data from the memory to the processing system in the communication device.

7. The battery of claim 5, wherein at least one of the contaminate sensors is configured to be selectively activated by the interface, and wherein the sensor interface is configured to receive instructions from the processing system in the communication device and to activate and take a sensor reading from the at least one contaminate sensor based on the received instructions.

8. The battery of claim 7, wherein the instructions include a time interval between sensor readings.

9. The battery of claim 1, wherein the battery housing comprises one or more openings configured to allow airborne substances external to the battery to enter the battery housing when the battery is in the battery compartment and interact with the one or more contaminate sensors.

10. The battery of claim 9, further comprising an air pump within the battery housing configured to pump air external to the battery into the battery housing through the one or more openings.

11. A method for measuring a contaminate condition external to, and for providing power to a communication device, the method comprising:
providing power to the communication device from a battery cell in a battery inserted in a battery compartment of the communication device;
measuring the contaminate condition external to the communication device using one or more contaminate sensors in the battery and generating a corresponding measurement;
communicating the measurement from the battery to a processing system in the communication device;
replacing the one or more contaminate sensors with at least one new contaminate sensor, the replacing comprising:
removing the battery from the battery compartment:
inserting a new battery in the battery compartment, the new battery having a new battery housing and, in the housing, a new battery cell and the at least one new contaminate sensor;
providing power to the communication device from the new battery cell in the new battery in the battery compartment of the communication device;
measuring the contaminate condition external to the communication device using the new at least one contaminant sensor in the new battery housing and generating another corresponding measurement; and
communicating the another measurement from the new battery to the processing system in the communication device.

12. The method of claim 11, wherein the one or more contaminate sensors are from a group consisting of chemical sensors, biological sensors and radiation sensors.

13. The method of claim 11, wherein the communicating the measurement comprises communicating the measurement from the battery to the processing system in the communication device using one or more contacts disposed on a housing of the battery.

14. The method of claim 11, wherein the communicating the measurement comprises communicating the measurement from the battery to the processing system in the communication device over a wireless link between the battery and the communication device.

15. The method of claim 11, wherein the communicating the measurement from the battery to the processing system in the communication device comprises:
receiving a measurement signal, from at least one of the sensors;
processing the measurement signal into sensor data indicating the measurement; and
sending the sensor data from the battery to the processing system in the communication device.

16. The method of claim 15, further comprising storing the sensor data in a memory in the battery, and wherein the communicating the measurement further comprises sending the sensor data from the memory in the battery to the processing system in the communication device.

17. The method of claim 15, further comprising receiving at the battery instructions from the processing system in the communication device, and wherein the measuring the condition external to the communication device using at least one of the contaminate sensors is based on the received instructions.

18. The method of claim 17, wherein the instructions include a time interval between sensor readings.

19. The method of claim 11, further comprising pumping air external to the battery into an interior of the battery housing, and wherein measuring the condition external to the communication device includes at least one of the contaminant sensors measuring a condition of the air pumped into the interior of the battery housing.

20. The battery of claim 1, wherein the an interface includes a tangible machine-readable media, and wherein the interface is further configured to detect when the communication device is powered down, and in response, to operate in a lower power mode, wherein the lower power mode includes a periodic wake-up, in accordance with a wake-up interval and, at each wake-up,
taking a sensor reading from at least one of the contaminant sensors, to obtain a sensor data,
determining a time associated with the taking a sensor reading,
applying a corresponding time stamp to the sensor data, based on the determined time,
storing at least a portion of the sensor data and the corresponding time stamp in the tangible machine readable media.

21. The battery of claim 20, wherein the interface is further configured to send an acknowledgement request message to the processing system of the communication, and to detect the communication device being powered down based on whether the interface receives, in response to the acknowledgement request message, an acknowledgement response.

22. The battery of claim 20, wherein the interface is further configured to detect the communication device being powered down by receiving a power down message from the processing system of the communication device.

23. The battery of claim 20, wherein the interface is further configured to detect, while in the lower power mode, the communication device being powered up and, in response, to send the sensor data and corresponding time stamps from the tangible machine readable media to the processing system in the communication device.

24. The battery of claim 1 wherein the battery housing is further configured to have a surface that, when the battery housing is inserted in the battery compartment, the surface covers a recess in the communication device to forms a portion of a device housing of the communication device.

25. The battery of claim 24, wherein the battery housing is further configured to have holes extending through said surface, the holes configured to form, when the battery housing is inserted in the battery compartment, holes through the portion of the device housing.

26. A method for measuring a contaminate condition external to, and for providing power to a communication device, the method comprising:
  providing power to the communication device from a battery cell in a battery inserted in a battery compartment of the communication device;
  measuring the contaminate condition external to the communication device using one or more contaminate sensors in the battery and generating a corresponding measurement;
  communicating the measurement from the battery to a processing system in the communication device;
  detecting at the battery when the communication device is powered down, and in response, taking sensor reading from at least one of the contaminate sensors according to a lower power mode, wherein the lower power mode includes performing, at a given interval, a low power sensor reading, comprising
    taking a sensor reading from at least one of the contaminant sensors, to obtain a sensor data,
    determining a time associated with the taking a sensor reading,
    applying a corresponding time stamp to the sensor data, based on the determined time, and
    storing at least a portion of the sensor data and the corresponding time stamp in a tangible machine-readable media at the battery.

27. The method of claim 26, further comprising:
  sending an acknowledgement request message from the battery to the processing system of the communication, and
  detecting the communication device being powered down based on whether the battery receives, in response to the acknowledgement request message, an acknowledgement response.

28. The method of claim 26, detecting the communication device being powered down comprises receiving, at the battery, a power down message from the processing system of the communication device.

29. The method of claim 26, further comprising detecting, while in the lower power mode, the communication device being powered up and, in response, to sending the sensor data and corresponding time stamps from the machine readable media to the processing system in the communication device.

30. A method for measuring a contaminate condition external to, and for providing power to a communication device, the method comprising:
  providing power to the communication device from a battery cell in a battery inserted in a battery compartment of the communication device;
  measuring the contaminate condition external to the communication device using one or more contaminate sensors in the battery and generating a corresponding measurement;
  communicating the measurement from the battery to a processing system in the communication device;
  changing a mode of the communication device to a mode without contaminate sensors, comprising:
  removing the battery from the battery compartment;
  inserting a new battery in the battery compartment, the new battery not having contaminate sensors; and
  providing power to the communication device from the new battery in the battery compartment of the communication device.

* * * * *